(12) United States Patent
Calmels

(10) Patent No.: US 8,386,217 B2
(45) Date of Patent: Feb. 26, 2013

(54) METHOD OF DETERMINING A STIFF VALUE OF AN AERODYNAMIC COEFFICIENT

(75) Inventor: Benoit Calmels, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 563 days.

(21) Appl. No.: 12/685,924

(22) Filed: Jan. 12, 2010

(65) Prior Publication Data

US 2011/0046926 A1    Feb. 24, 2011

(30) Foreign Application Priority Data

Feb. 9, 2009 (FR) ..................... 09 00548

(51) Int. Cl.
*G06F 7/60* (2006.01)
*G06F 17/10* (2006.01)
(52) U.S. Cl. .............................. 703/2; 703/8
(58) Field of Classification Search .......... 703/6–8, 703/2
See application file for complete search history.

(56) References Cited

U.S. PATENT DOCUMENTS

| | | | |
|---|---|---|---|
| 3,224,265 | A | 12/1965 | Mazelsky et al. |
| 6,721,682 | B1 | 4/2004 | Moore et al. |
| 2002/0069040 | A1 | 6/2002 | Omotani |
| 2005/0197811 | A1* | 9/2005 | Ariyur ........................... 703/8 |

OTHER PUBLICATIONS

Heeg et al. "Experimental Results from the Active Aeroelastic Wing Wind Tunnel Test Program"., American Institute of Aeronautics and Astronautics., 2005., 16 Pages.*

John R. Hooker et al., "Static Aeroelastic Analysis of Transonic Wind Tunnel Models Using Finite Element Methods", American Institute of Aeronautics and Astronautics, Jan. 1, 1997, XP008112245, pp. 254-262.

Bret Stanford et al., "Static Aeroelastic Model Validation of Membrane Micro Air Vehicle Wings", American Institute of Aeronautics and Astronautics Journal, vol. 45, No. 12, Dec. 2007, XP-002547184, pp. 2828-2837.

Daniella E. Raveh, "Computational-fluid-dynamics-based aeroelastic analysis and structural design optimization—a researcher's perspective", Computer Method in Applied Mechanics and Engineering, Aug. 2005, XP004921674, pp. 3453-3471.

R. Albertani et al., "Aerodynamic Coefficients and Deformation Measurements on Flexible Micro Air Vehicle Wings", Experimental Mechanics, vol. 47, No. 5, Oct. 2007, XP-002547185, pp. 625-635.

J.C. Newman III, et al., "Efficient nonlinear static aeroelastic wing analysis", Computers & Fluids, vol. 28, No. 4-5, May 1999, XP-002547182, pp. 615-628.

* cited by examiner

*Primary Examiner* — Eunhee Kim
(74) *Attorney, Agent, or Firm* — Oblon, Spivak, McClelland, Maier & Neustadt, L.L.P.

(57) ABSTRACT

Method for determination of a rigid value of an aerodynamic coefficient of an aircraft, in which measurements are made in a wind tunnel on a model of the said aircraft and, on the basis of these measurements, at least one value, known as flexible model value, of this aerodynamic coefficient is determined, characterized in that a rigid value of the aerodynamic coefficient is calculated on the basis of the said flexible model value(s) and a correction taking into account the flexibility of the model. A plurality of flexible model values is determined on the basis of measurements made by varying the parameter q/E and maintaining the angle of incidence at a constant value, and the correction consists in an extrapolation operation providing a value of the aerodynamic coefficient corresponding to q/E=0. As a variant, a single flexible model is determined and the correction consists in adjusting the said value with the aid of a correction factor.

11 Claims, 2 Drawing Sheets

METHOD OF DETERMINING A STIFF VALUE OF AN AERODYNAMIC COEFFICIENT

BACKGROUND OF THE INVENTION

This invention relates to a method for determination of a rigid value of an aerodynamic coefficient of an aircraft.

Throughout the description, the term "aircraft" is used to designate generically a type of aircraft (for example an aircraft known under the name A320 or A319 . . . ) and not a given specimen.

Furthermore, the terms "aerodynamic coefficient" designate in usual manner adimensional coefficients used to quantify the forces or moments exerted by the air in motion on a part or the entirety of the aircraft. Among these coefficients there may be cited, for example, the lift coefficient $C_Z$, the drag coefficient $C_X$, the lateral force (or drift) coefficient $C_Y$, the roll moment coefficient $C_L$, the pitch moment coefficient $C_M$, the yaw moment coefficient $C_N$, or else any pressure coefficient making it possible to quantify locally the pressure exerted by the air in motion. The terms "aerodynamic coefficient" here also extend to other characteristic parameters of the aerodynamics of the aircraft, such as the efficacies in lift, in drag, in drift, in roll, in pitch and in yaw of a mobile surface (aileron, spoiler, flap . . . ) of the aircraft. The efficacy in lift (respectively in drag, in drift, etc.) of a mobile surface expresses the impact of the total deflection of this mobile surface on the lift (respectively drag, drift, etc.) coefficient of the aircraft.

It should be noted that the value of an aerodynamic coefficient depends on a set of environmental and operational conditions, including the temperature of the air, the pressure, the speed of the air flow in relation to the aircraft, the angle of incidence . . . . These conditions also may be defined with the aid of basic parameters such as: the Reynolds number Re, which represents the ratio between the inertia forces and the viscous forces (with $Re = \rho VL/\mu = VL/v$, where V is the speed of the air flow in relation to the aircraft, L the characteristic length, $\rho$ the voluminal mass of the air, $\mu$ the dynamic viscosity of the air and $v$ the kinematic viscosity of the air); the Mach number Ma, which represents the ratio between the speed of the air flow in relation to the aircraft and the speed of sound, etc.

Finally, by "rigid value" of such an aerodynamic coefficient there is understood the theoretical value which this coefficient would assume if the aircraft were perfectly rigid, for the set of environmental and operational conditions under consideration.

The digital calculation models used to dimension the different parts of an aircraft generally bring in rigid values of aerodynamic coefficients. Nowadays there are used in the known digital models, as rigid values of the aerodynamic coefficients of an aircraft, values of the coefficients determined on the basis of results of tests conducted in a wind tunnel on a model of the aircraft, considering that such a model is practically rigid.

SUMMARY OF THE INVENTION

The invention is intended to optimize the design of aircraft by improving the accuracy obtained in the determination of rigid values of the aerodynamic coefficients of aircraft.

To accomplish this, the invention proposes a method for determination of a rigid value of an aerodynamic coefficient of an aircraft for a given set of conditions, in which measurements are made in a wind tunnel on a model representing the aircraft for the set of conditions involved, and on the basis of these measurements at least one experimental value, known as flexible model value, of this aerodynamic coefficient is obtained. The method according to the invention is characterized in that there is calculated a rigid value of the aerodynamic coefficient on the basis of the flexible model value or values and a correction taking into account the flexibility of the model.

The inventor in fact was surprised to note, upon analyzing tests in a pressurized and cryogenic wind tunnel, that the effect of the flexibility of the model was not insignificant, contrary to the hypotheses accepted until now by the individual skilled in the art. In such a wind tunnel, it is possible to vary the parameter q/E, where "q" designates the dynamic pressure of the air in motion ($q = \rho V^2/2$) and "E" designates the Young's modulus of the model, while maintaining the Reynolds number at a constant desired value, and vice versa. The results of the analyses conducted by the inventor revealed that the aerodynamic coefficients could vary according to the parameter q/E to an extent greater than expected. The inventor thus made it known that the effect of the flexibility of the aircraft models on the aerodynamic coefficients was more significant than the individual skilled in the art had deemed until then, and that the inaccuracies allowed for the determination of rigid values of these aerodynamic coefficients led to an approximate dimensioning of the aircraft. The invention therefore recommends, for the first time, applying a correction taking into account the flexibility of the model used in order to determine rigid values of the aerodynamic coefficients of an aircraft.

In a first version of the invention, a plurality of flexible model values of the aerodynamic coefficient is determined on the basis of measurements made by varying the value of the parameter q/E and maintaining the angle of incidence at a constant value corresponding to the set of conditions involved. In this first version, the correction consists in an extrapolation operation on the basis of this plurality of flexible model values intended to provide a value of the aerodynamic coefficient, considered as being the rigid value sought, corresponding to the value zero of the parameter q/E. To accomplish this, there is plotted, for example, the curve representing the flexible model values according to the coefficient q/E, and this curve is extended by extrapolation until q/E=0. The sought rigid value of the aerodynamic coefficient is equal to the value given by the curve extended in this way for q/E=0.

Advantageously, in this first version, the measurements are made while also maintaining the Mach number at a constant value corresponding to the set of conditions involved. In that way, the accuracy obtained in the determination of the rigid value of the aerodynamic coefficient also is greater. Preferably, the Reynolds number also is maintained at a constant value corresponding to the set of conditions involved, for a maximal accuracy.

It should be noted that, in this first version, the measurements preferably are made in a pressurized and cryogenic wind tunnel, but also may be made in a standard wind tunnel. The choice of a pressurized and cryogenic wind tunnel is imperative, however, in the case in which it is desired to make the measurements with constant Mach and/or Reynolds number(s).

In a second version of the invention, the rigid value of the aerodynamic coefficient is calculated on the basis of a single flexible model value and a correction factor representative of the effect of the flexibility of the model on the aerodynamic coefficient. In this second version, the correction therefore consists in an adjustment of a flexible model value with the aid of a correction factor. Since only one flexible model value of the aerodynamic coefficient is necessary, the measurements made in order to determine this flexible model value preferably are conducted in a standard wind tunnel, for the sake of economy.

In order to calculate the correction factor, several embodiments are possible.

According to a first embodiment:

a digital object is generated, known as reference object, representative of the shape that the aircraft assumes under predetermined reference conditions and, with the aid of a digital aerodynamic model, the value of the aerodynamic coefficient of this reference object is calculated for the set of conditions involved, which value is known as rigid correction value of the aerodynamic coefficient, deformations of the model for the set of conditions involved are measured in a wind tunnel, on the basis of these deformation measurements, a digital object is generated, known as experimental flexible object, representative of the shape assumed by the model for this set of conditions and, with the aid of a digital aerodynamic model, the value of the aerodynamic coefficient of the experimental flexible object is calculated for the set of conditions involved, which value is known as flexible correction value of the aerodynamic coefficient, the correction factor is calculated on the basis of the previously calculated rigid correction value and the flexible correction value of the aerodynamic coefficient.

According to a second embodiment:

a digital object is generated, known as reference object, representative of the shape that the aircraft assumes under predetermined reference conditions and, with the aid of a digital aerodynamic model, the value of the aerodynamic coefficient of this reference object is calculated for the set of conditions involved, which value is known as rigid correction value of the aerodynamic coefficient, on the basis of the reference object and with the aid of a digital aeroelastic model, the value of the aerodynamic coefficient of the reference object considered as flexible is calculated for the set of conditions involved, which value is known as flexible correction value of the aerodynamic coefficient, the correction factor is calculated on the basis of the previously calculated rigid correction value and flexible correction value of the aerodynamic coefficient.

According to a third embodiment, the correction factor is calculated on the basis of a rigid correction value and a flexible correction value of the aerodynamic coefficient calculated beforehand for the set of conditions involved for a model representative of another aircraft, known as reference aircraft, that has shapes similar to the aircraft being studied (aircraft for which it is desired to determine a rigid aerodynamic coefficient value). The reference aircraft preferably has shapes similar to the aircraft being studied at least with regard to the parts of the aircraft that determine the aerodynamic coefficient. The rigid and flexible correction values of the aerodynamic coefficient of the reference aircraft advantageously are values that have been determined beforehand with the aid of one or the other of the first and second embodiments described above. This third embodiment avoids having to redo aerodynamic calculations as well as deformation measurements in a wind tunnel or aeroelastic calculations, relatively costly. As against this, the accuracy obtained in the determination of the rigid value of the aerodynamic coefficient may be lower. It nonetheless is clearly higher than that procured by the prior known methods (which do not provide for any correction of the effect of the flexibility of the model).

Irrespective of the embodiment used for the calculation of a rigid correction value and a flexible correction value of the aerodynamic coefficient, the correction factor advantageously is equal to the difference between the rigid correction value and the flexible correction value of the aerodynamic coefficient. Furthermore, the rigid value of the aerodynamic coefficient is equal to the sum of the flexible model value and the correction factor.

As a variant, the correction factor is equal to the ratio of the rigid correction value over the flexible correction value of the aerodynamic coefficient. Furthermore, the rigid value of the aerodynamic coefficient is equal to the product of the flexible model value times the correction factor.

The correction factor advantageously is an average factor calculated on the basis of at least two correction factors obtained according to at least two of the embodiments defined above.

More generally, the rigid value of the aerodynamic coefficient may be refined by using several of the versions and/or embodiments of the invention. For example, the rigid value of the aerodynamic coefficient advantageously is an average value calculated on the basis of at least two rigid values obtained according to at least two of the versions and/or embodiments defined above.

The invention extends to a method for determination of a rigid value of an aerodynamic coefficient characterized in combination by all or part of the characteristics described above and below.

FIG. 1 is a graph illustrating the variation of efficacy in lift of an aileron of an aircraft model according to the parameter q/E; and FIG. 2 is a flowchart illustrating a process of a non-limiting embodiment of the invention.

BRIEF DESCRIPTION OF THE DRAWINGS

Other details and advantages of this invention will become apparent upon reading of the following description, which refers to the attached schematic drawing and concerns preferential embodiments, provided by way of non-limitative examples.

DETAILED DESCRIPTION OF THE INVENTION

The invention makes it possible, for example, to determine with an increased accuracy a rigid value (marked $dC_{Z\text{-}rigid}$) of the efficacy in lift of an aileron of a given aircraft, for a predetermined set of conditions (environmental and operational). The efficacy in lift of an aileron—for a given angle—is defined as being the difference $dC_Z$ between the value of the lift coefficient $C_Z$ of the aircraft when the aileron is deflected—with this given angle—and the value of the lift coefficient $C_Z$ of the aircraft in the absence of deflection of the aileron, for a given set of conditions.

Figure 1:
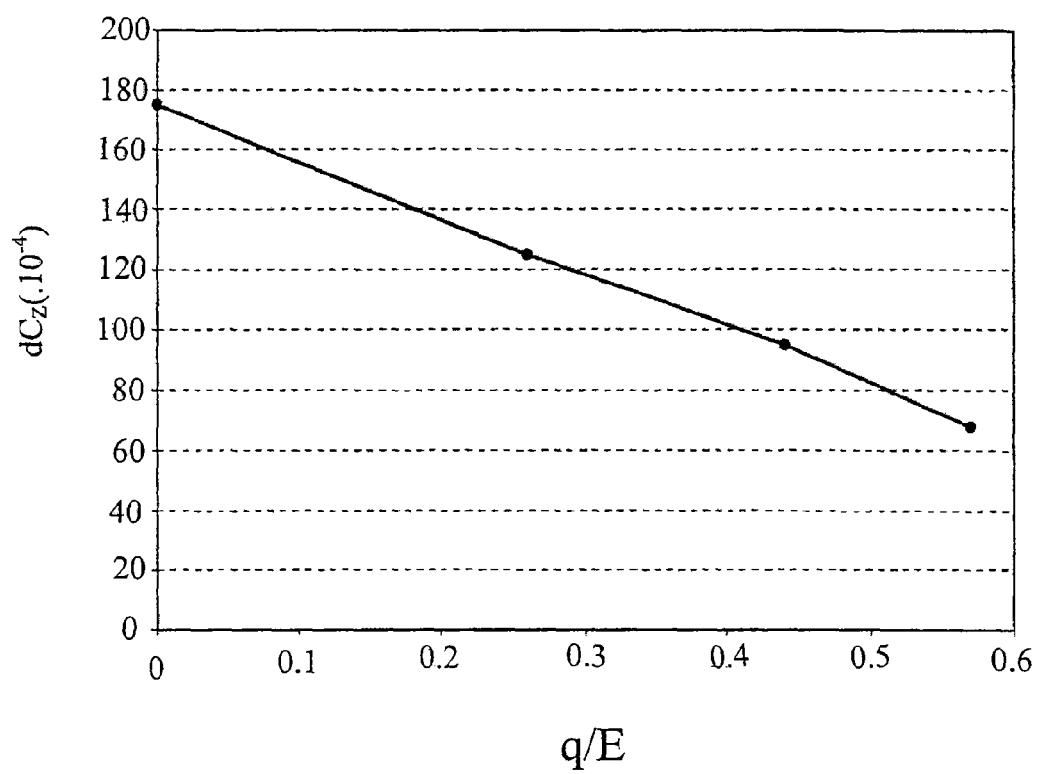
FIG. 1 is a graph illustrating the variation of efficacy in lift of an aileron of an aircraft model according to the parameter q/E.
Figure 2:
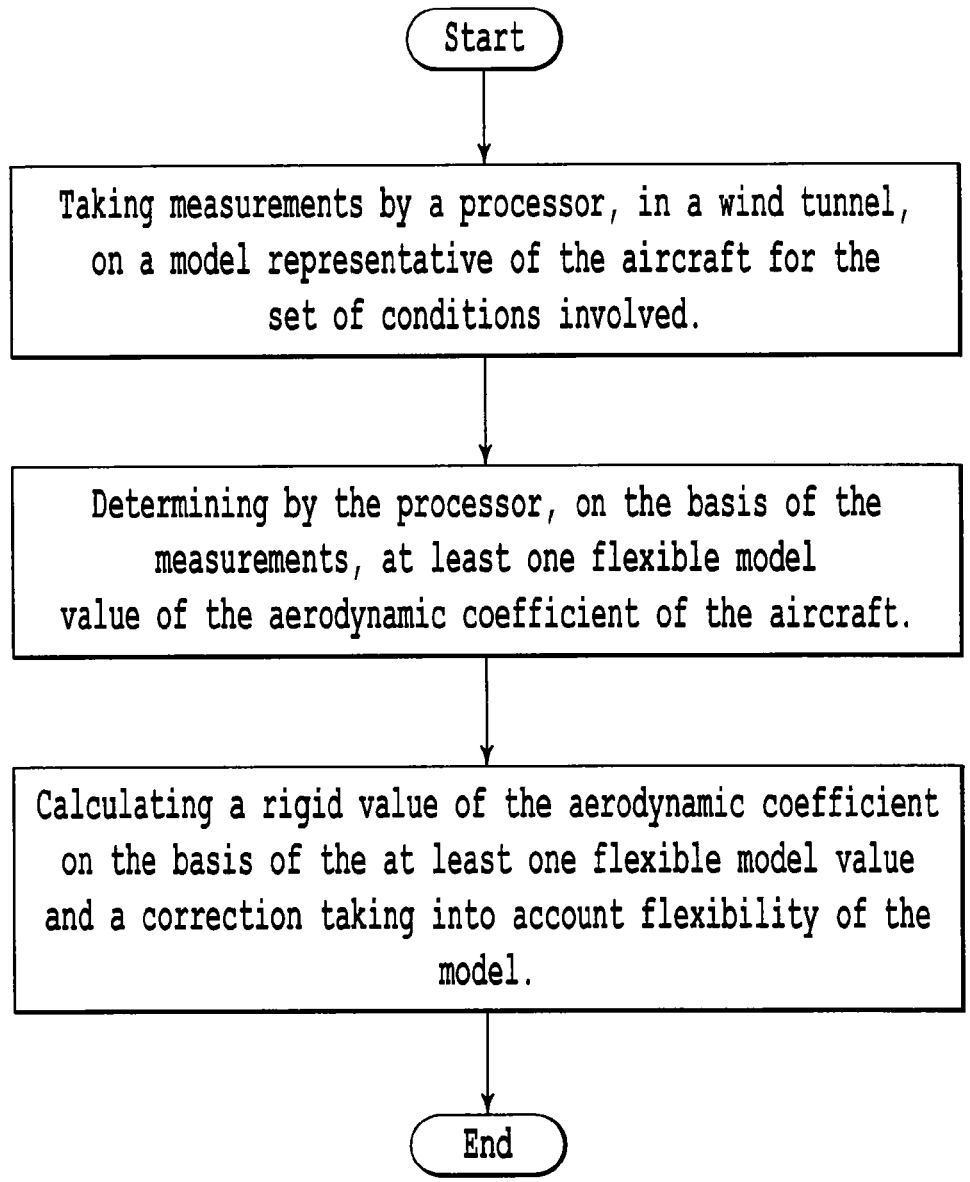
FIG. 2 is a flowchart illustrating a process of a non-limiting embodiment of the invention.

According to a first version of the invention, tests are performed in a cryogenic and pressurized wind tunnel on a model representing the aircraft being studied. In the context of these tests, the parameter q/E is varied while maintaining the other basic parameters—such as the Reynolds number, the Mach number and the incidence—at respective constant values corresponding to the set of conditions being studied. For each q/E applied, there are measured, by any appropriate known method, on the one hand the lift coefficient $C_Z$ of the model with the aileron deflected, and on the other hand the lift coefficient $C_Z$ of the model in the absence of deflection of the aileron. By calculation of these measurements, there is deduced a value $dC_{Z\text{-}flexible\text{-}model}(q/E)$, known as flexible model value, of the efficacy in lift of the aileron of the model for each q/E. These flexible model values are transferred to a graph such as illustrated on FIG. 1. There is deduced therefrom by extrapolation (taking into account the shape of the curve so plotted and in particular its slope and the variation of its slope) a value of efficacy $dC_Z$ for q/E=0, which is considered as being a very good evaluation of the theoretical rigid value of the efficacy in lift $dC_Z$ of the aileron. In other terms, according to this first version of the invention:

$$dC_{Z\text{-}rigid} = dC_{Z\text{-}flexible\text{-}model}(q/E=0).$$

A second version of the invention consists in determining only one flexible model value of the aerodynamic coefficient being studied, and in correcting this flexible model value with the aid of a correction factor. This second version of the invention is described in greater detail below, taking for example the determination of a rigid value of the lift coefficient $C_Z$ of an aircraft.

According to this second version of the invention, tests are performed in a wind tunnel (preferably a standard wind tunnel, as opposed to cryogenic and pressurized wind tunnels), on a model representing the aircraft, so as to measure, by any appropriate known method, the lift coefficient Cz of the model. These tests are performed for a sole value of q/E, as well as for respective sole values of the angle of incidence, the Mach number and the Reynolds number, the set of parameters being established according to the set of conditions being studied. The value of the lift coefficient of the model measured in this way is known as flexible model value and is marked $C_{Z\text{-}flexible\text{-}model}$.

Then a correction factor representative of the effect of the flexibility of the model on the lift coefficient thereof is calculated.

To accomplish this, according to first and second embodiments of this second version, a digital object is generated, known as reference object, representative of a reference shape, known as rigid shape, which the aircraft assumes under predetermined reference conditions. With the aid of a digital aerodynamic model, the value of the coefficient $C_Z$ of this reference object then is calculated for the set of conditions being studied, which value is known as rigid correction value and is marked $C_{Z\text{-}rigid\text{-}correction}$. It is recalled that an aerodynamic model takes for a hypothesis that the object being studied is rigid and does not simulate any deformation thereof.

Furthermore, according to the first embodiment, there is measured in a wind tunnel the deformation of the model (and particularly of its wing) subjected to the set of conditions being studied, in a multitude of points by any appropriate method. These measurements of deformation may be made in the context of the battery or batteries of tests performed to determine the $C_{Z\text{-}flexible\text{-}model}$ or in the context of one or more other batteries of tests. On the basis of these deformation measurements, there is generated a digital object, known as experimental flexible object, representative of the shape assumed by the model during the tests. With the aid of a digital aerodynamic model, the value of the coefficient $C_Z$ of the experimental flexible object then is calculated, which value is known as flexible correction value and is marked $C_{Z\text{-}flexible\text{-}correction}$. It should be noted that the digital aerodynamic model used for the calculation of $C_{Z\text{-}flexible\text{-}correction}$ may be (preferably) the same model or a model other than the one used for the calculation of $C_{Z\text{-}rigid\text{-}correction}$.

According to the second embodiment, there is calculated on the basis of the reference object and with the aid of a digital aeroelastic model, the value, for the set of conditions being studied, of the coefficient $C_Z$ of the reference object considered as flexible, which value also is known as flexible correction value and is marked $C_{Z\text{-}flexible}$-correction. It is recalled that an aeroelastic model brings in the flexibility of the object and simulates not only the air flow around the object but also the deformation of the latter. This second embodiment makes it possible to dispense with tests provided for in the first embodiment, but as against this it necessitates making an aeroelastic calculation, more complex and more costly than the aerodynamic calculation provided for in the first embodiment.

According to a third embodiment of the second version of the invention, there are chosen, as rigid and flexible correction values of the coefficient $C_Z$, a previously determined rigid correction value and a flexible correction value for the set of conditions being studied for a model representing another aircraft—for example the aircraft known under the name A320—that has shapes similar to the aircraft being studied—for example the aircraft known under the name A319.

In other terms, for this third embodiment:

$$C_{Z\text{-}rigid\text{-}correction(A319)} = C_{Z\text{-}rigid\text{-}correction\text{-}A320}, \text{ and}$$

$$C_{Z\text{-}flexible\text{-}correction(A319)} = C_{Z\text{-}flexible\text{-}correction\text{-}A320}.$$

For the three embodiments, the correction factor, marked $\Delta C_{Z\text{-}model}$, is provided by the equation:

$$\Delta C_{Z\text{-}model} = C_{Z\text{-}rigid\text{-}correction} - C_{Z\text{-}flexible\text{-}correction}.$$

and the rigid value of the lift coefficient of the aircraft then is provided by the equation:

$$C_{Z\text{-}rigid} = C_{Z\text{-}flexible\text{-}model} + \Delta C_{Z\text{-}model}$$

The correction applied to the $C_{Z\text{-}flexible\text{-}model}$ in this case is additive.

As a variant, the correction factor, in this case marked $KC_{Z\text{-}model}$, is given by the equation $KC_{Z\text{-}model} = C_{Z\text{-}rigid\text{-}correction}/C_{Z\text{-}flexible\text{-}correction}$, and the rigid value of the lift coefficient of the aircraft is the following:

$$C_{Z\text{-}rigid} = C_{Z\text{-}flexible\ model} \times KC_{Z\text{-}model}$$

The correction applied to the $C_{Z\text{-}flexible\text{-}model}$ in this case is multiplicative.

The rigid value of the coefficient $C_Z$ may be refined for example by calculating a first rigid value by using the first embodiment with an additive correction, and a second rigid value by using the second embodiment with a multiplicative correction. All the combinations (between the first version of the invention and the three embodiments of the second version) are possible.

The invention may be subjected to numerous variants with regard to the illustrated embodiment, as long as these variants fall within the context defined by the claims.

In particular, the invention applies to the calculation of a rigid value of any aerodynamic coefficient of any part or of the entirety of an aircraft (it does not apply only to the calculation of a rigid value of the lift coefficient of the aircraft or the efficacy in lift of an aileron of the aircraft).

The invention claimed is:
1. A method for determining a rigid value of an aerodynamic coefficient of an aircraft for a given set of conditions, the rigid value of the aerodynamic coefficient is a value the coefficient would assume if the aircraft were perfectly rigid, the method comprising:

taking measurements by a processor, in a wind tunnel, on a model representative of the aircraft for the set of conditions involved; and determining by the processor or by a second processor, on the basis of the measurements, at least one flexible model value of the aerodynamic coefficient of the aircraft, wherein the rigid value of the aerodynamic coefficient is calculated on the basis of the at least one flexible model value and a correction taking into account flexibility of the model.

2. The method according to claim 1, further comprising:

determining, a plurality of flexible model values of the aerodynamic coefficient, based on measurements made by varying the value of a parameter q/E, where q is dynamic pressure of air in motion and E is Young's modulus of the model; and maintaining an angle of incidence at a constant value corresponding to the set of conditions involved, wherein the correction consists of an extrapolation operation on the basis of the plurality of flexible model values intended to provide a value of the aerodynamic coefficient, considered as being the rigid value sought, corresponding to the zero value of the parameter q/E.

3. The method according to claim 2, wherein the measurements are made while also maintaining a Mach number and a Reynolds number at respective constant values corresponding to the set of conditions involved.

4. The method according to claim 2, wherein the measurements are made in a pressurized and cryogenic wind tunnel.

5. The method according to claim 1, wherein the rigid value of the aerodynamic coefficient is calculated on the basis of the flexible model value and a correction factor representative of the effect of the flexibility of the model on the aerodynamic coefficient.

6. The method according to claim 5, wherein the correction factor is calculated as follows:

generating a digital reference object, representative of the shape that the aircraft assumes under predetermined reference conditions and, with the aid of a digital aerodynamic model, a rigid correction value of the aerodynamic coefficient of the digital reference object is calculated for the set of conditions involved;

measuring deformations of the model for the set of conditions involved in a wind tunnel;

generating an experimental flexible digital object, on the basis of these deformation measurements, representative of the shape assumed by the model for this set of conditions;

calculating, with the aid of a digital aerodynamic model, a flexible correction value of the aerodynamic coefficient of the experimental flexible digital object for the set of conditions involved; and calculating the correction factor on the basis of the previously calculated rigid correction value and the flexible correction value of the aerodynamic coefficient.

7. The method according to claim 5, wherein the correction factor is calculated as follows:

generating a digital reference object representative of the shape that the aircraft assumes under predetermined reference conditions;

calculating, with the aid of a digital aerodynamic model, the rigid correction value of the aerodynamic coefficient of the digital reference object for the set of conditions involved;

calculating, on the basis of the digital reference object and with the aid of a digital aeroelastic model, a flexible correction value of the aerodynamic coefficient of the digital reference object considered as flexible for the set of conditions involved; and calculating the correction factor on the basis of the previously calculated rigid correction value and flexible correction value of the aerodynamic coefficient.

8. The method according to claim 5, wherein the correction factor is calculated on the basis of a rigid correction value and a flexible correction value of the aerodynamic coefficient calculated beforehand for the set of conditions concerned for a reference aircraft model representing another aircraft, that has shapes similar to the aircraft being studied, at least in regard to the parts of the aircraft that determine the aerodynamic coefficient.

9. The method according to claim 8, wherein the correction factor is equal to a difference between the rigid correction value and the flexible correction value of the aerodynamic coefficient, and the rigid value of the aerodynamic coefficient is equal to the sum of the flexible model value and the correction factor.

10. The method according to claim 8, wherein the correction factor is equal to a ratio of the rigid correction value over the flexible correction value of the aerodynamic coefficient, and the rigid value of the aerodynamic coefficient is equal to the product of the flexible model value times the correction factor.

11. The method according to claim 1, wherein the flexible model value is a lift coefficient of the model.

* * * * *